W. H. THIEMER.
UNIVERSAL JOINT.
APPLICATION FILED JUNE 19, 1919.
1,418,689.
Patented June 6, 1922.
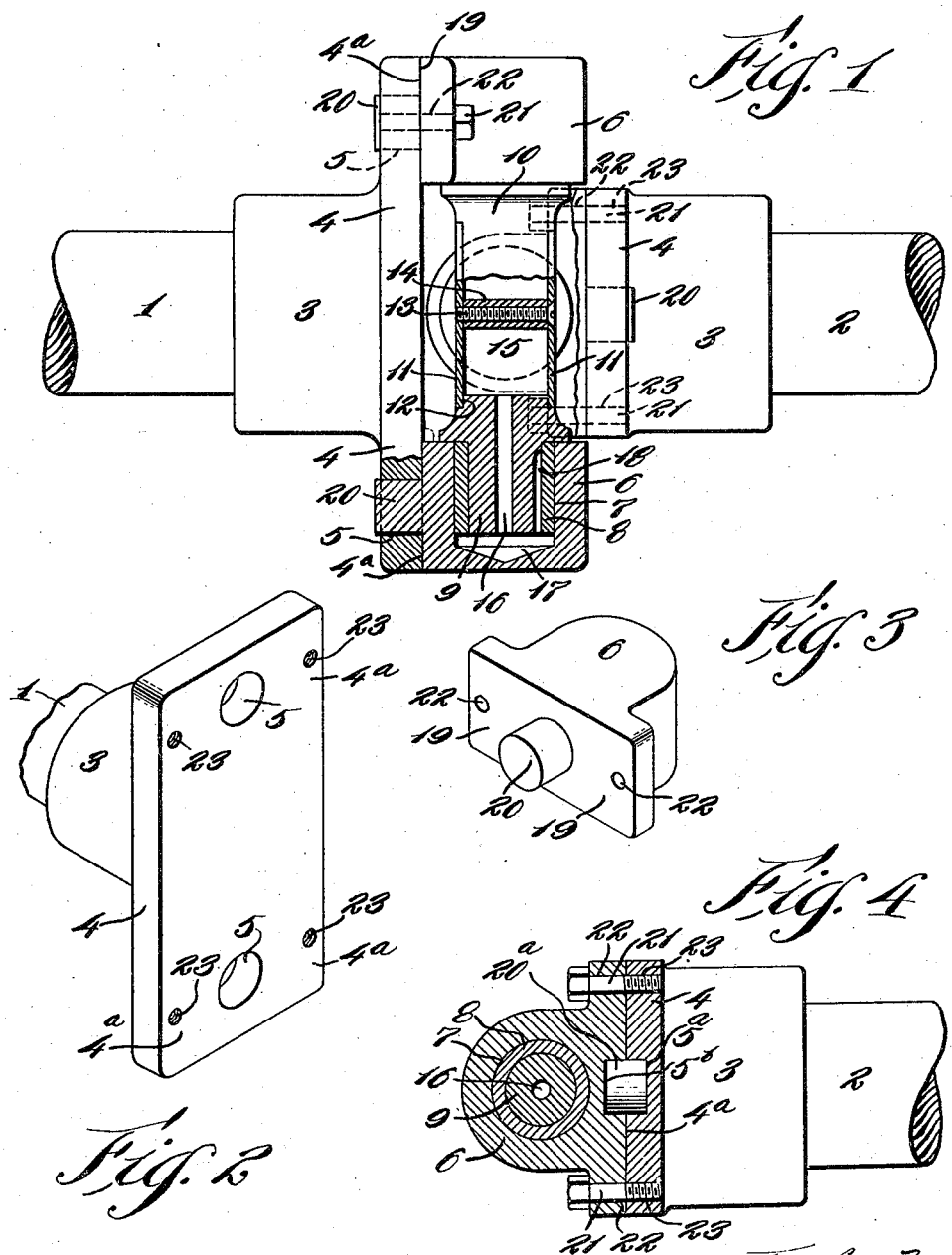

UNITED STATES PATENT OFFICE.

WILLIAM H. THIEMER, OF CLEVELAND, OHIO, ASSIGNOR TO THE PETERS MACHINE & MANUFACTURING COMPANY, OF CLEVELAND, OHIO, A CORPORATION OF OHIO.

UNIVERSAL JOINT.

1,418,689.              Specification of Letters Patent.      Patented June 6, 1922.

Application filed June 19, 1919. Serial No. 305,332.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and has for its general object to provide a joint of this character which may be conveniently assembled and disassembled and which is economical of production, simple in construction, and efficient in operation.

In the drawings forming part hereof, Fig. 1 represents a sectional side elevation of a universal joint constructed in accordance with my invention, together with the cooperating shaft sections united thereby; Fig. 2 is a detail in perspective of the supporting base or flange for the bearing blocks; Fig. 3 a similar view of one of said blocks; and Fig. 4 a sectional view, through a modified form of bearing block and seat, the connecting dowel pin being shown in elevation.

Describing the various parts by reference characters, 1 and 2 denote the ends of shaft sections each being shown as provided with a hub 3 having a base flange 4 projecting therefrom. Each base flange is provided with a flat or plane seat $4^a$ at each end thereof, each seat having cylindrical recess 5 projecting outwardly from the inner face thereof. Cooperating with each seat is a bearing block, indicated generally at 6. Each block is shown as provided with a bore 7 extending outwardly from the inner face thereof and terminating within the outer face. Each bore is adapted to receive a bushing 8 surrounding a trunnion 9 on the connecting member 10. The connecting member may be of the ring type and provided with cover plates 11 fitted within annular recesses 12 on each side of the inner surface of said ring, the plates being shown as connected by a bolt 13 mounted within a spacing sleeve 14, the said plates and the interior of the ring forming a central chamber 15 for lubricant. Lubricant from this chamber will be distributed by centrifugal action through a radial port 16 in each trunnion to the well 17 provided beyond each trunnion within its bearing block and thence between each trunnion and its bushing, as by means of a port 18 which may be formed as a groove in the outer surface of each trunnion.

Each bearing block is provided with a flat base 19 adapted to rest upon a flat seat $4^a$ and with a centrally located cylindrical key projection 20 adapted to enter one of the cylindrical recesses 5 in a seat of the base flange, the said key projections being of substantially the same diameter as the diameters of the recesses, whereby they will engage the walls of said recesses and form a driving connection, with the trunnion, between the two shaft sections. The bearing blocks are secured to the base flanges, as by means of bolts 21 extending through apertures 22 in projections on each side of the bearing block and threaded into apertures 23 in the base flange on each side of the seats $4^a$.

In Fig. 4 there is shown a modification wherein each base flange 4 is provided with cylindrical recesses $5^a$ extending into the seats thereof and each bearing block 6 is provided with a similar recess $5^b$ adapted to register with a recess $5^a$. The bearing blocks are secured to their respective seats by inserting into the recesses 5 cylindrical blocks $20^a$ which are preferably about the length of the combined recesses $5^a$, $5^b$ and of the same diameter as the internal diameters of said recesses, whereby they provide a driving connection between the shaft sections through the trunnions and bearing blocks. The bearing blocks will be secured to their respective seats in the same manner as is the case with the embodiment of my invention shown in Figs. 1–3 inclusive.

Having thus described my invention, what I claim is:

1. In a universal joint, the combination of a hub having a base flange, said flange having a seat at each end thereof provided with a cylindrical recess, a pair of bearing blocks, a cylindrical key projection extending into each recess and forming driving connections between the bearing blocks and the base flange, and means additional to said projections for securing said bearing blocks to said flange.

2. In a universal joint, the combination of a hub having a base flange, said flange having a seat and said seat having a recess extending outwardly from the inner face thereof and partly through the same, a bearing block for said seat having a face adapted to cooperate with such seat and provided with a recess adapted to register with the recess in such seat, a cylindrical locking key adapted to be inserted in the registering recesses of said seat and block, and means for securing the bearing block to said flange and upon its seat.

In testimony whereof, I hereunto affix my signature.

WILLIAM H. THIEMER.